(12) United States Patent
Sasaki

(10) Patent No.: US 6,743,121 B2
(45) Date of Patent: Jun. 1, 2004

(54) MULTI-PIECE SOLID GOLF BALL

(75) Inventor: Takashi Sasaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/284,381

(22) Filed: Oct. 31, 2002

(65) Prior Publication Data

US 2003/0130066 A1 Jul. 10, 2003

(30) Foreign Application Priority Data

Oct. 31, 2001 (JP) ........................... 2001-334727

(51) Int. Cl.[7] .................. A63B 37/04; A63B 37/06; A63B 37/00
(52) U.S. Cl. .................................. 473/371; 473/351
(58) Field of Search .................. 473/351–378

(56) References Cited

U.S. PATENT DOCUMENTS

| | | | |
|---|---|---|---|
| 4,062,825 A | * 12/1977 | Watabe et al. | 524/847 |
| 5,553,852 A | 9/1996 | Higuchi et al. | |
| 5,692,974 A | * 12/1997 | Wu et al. | 473/377 |
| 5,782,707 A | * 7/1998 | Yamagishi et al. | 473/374 |
| 5,820,487 A | * 10/1998 | Nakamura et al. | 473/374 |
| 5,899,822 A | 5/1999 | Yamagishi et al. | |
| 6,248,029 B1 | 6/2001 | Maruko | |

FOREIGN PATENT DOCUMENTS

| | | |
|---|---|---|
| JP | 10-151226 A | 6/1998 |
| JP | 2910516 B2 | 4/1999 |
| JP | 11-151320 A | 6/1999 |

* cited by examiner

*Primary Examiner*—Gregory Vidovich
*Assistant Examiner*—Alvin A. Hunter, Jr.
(74) *Attorney, Agent, or Firm*—Birch, Stewart, Kolasch & Birch, LLP

(57) ABSTRACT

The present invention provides a multi-piece solid golf ball, which is superior in flight distance, spin performance, shot feel and scuff resistance. The present invention relates to a multi-piece solid golf ball comprising a core consisting of a center and an intermediate layer, and a cover covering the core, wherein the center has a diameter of 37 to 41 mm, the intermediate layer has a thickness of 0.5 to 2.0 mm and a hardness in Shore D hardness of 55 to 70, the hardness of the intermediate layer is higher than a surface hardness in Shore D hardness of the center and a hardness in Shore D hardness of the cover, and a specific gravity of the intermediate layer is lower than that of the center and cover, the cover comprises polyurethane-based thermoplastic elastomer as a main component, and has a thickness of 0.3 to 1.0 mm.

10 Claims, 2 Drawing Sheets

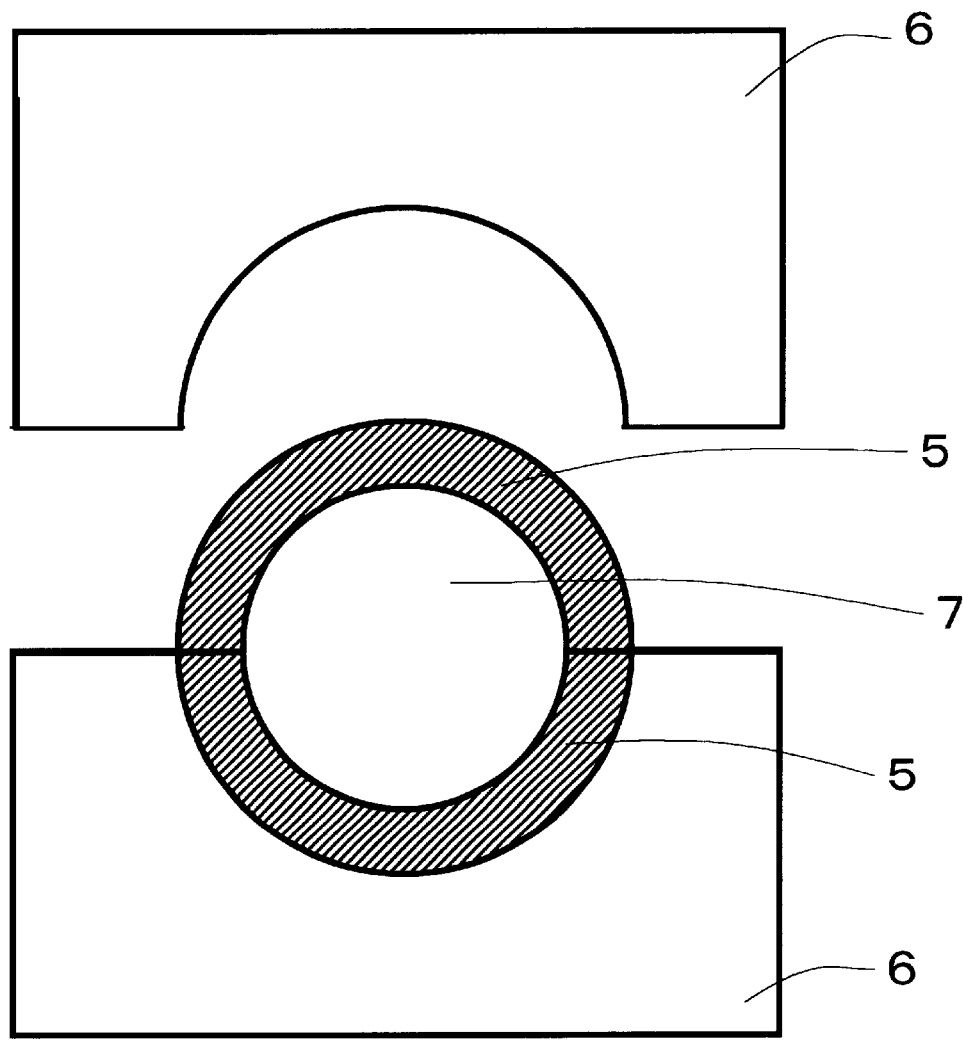

MULTI-PIECE SOLID GOLF BALL

This nonprovisional application claims priority under 35 U.S.C. §119(a) on Patent Application No. 2001-334727 filed in JAPAN on Oct. 31, 2001, which is herein incorporated by reference.

FIELD OF THE INVENTION

The present invention relates to a multi-piece solid golf ball. More particularly, it relates to a multi-piece solid golf ball, which is superior in flight distance, spin performance, shot feel and scuff resistance.

BACKGROUND OF THE INVENTION

As golf balls with high spin performance at approach shot and long flight distance, two-layer structured core type or two-layer structured cover type golf balls have been proposed which comprise a center formed from soft rubber, an intermediate layer formed on the center and from rubber or resin that is relatively harder than the center and a cover formed from soft material (Japanese Patent No. 2910516, Japanese Patent Publication Nos. 151226/1998, 151320/1999 and the like).

In Japanese Patent No. 2910516, a multi-piece golf ball, of which the center has a diameter of not less than 29 mm, the intermediate layer has a JIS-C hardness of not less than 85, and the specific gravity of the center is larger than that of the intermediate layer, is described. However, since the thickness of the cover is large, which is within the range of 1 to 3 mm, the rebound characteristics of the resulting golf ball are poor, and the flight distance when hit by a driver is not sufficiently obtained.

In Japanese Patent Publication No. 151226/1998, a multi-piece golf ball, of which the center has a distortion of at least 2.5 mm under a load of 100 kg, the Shore D hardness of the intermediate layer is at least 13 degrees higher than that of the cover, and the ball as a whole has an inertia moment of at least 83 g-cm$^2$, is described. However, since the cover is soft and the thickness of the cover is large, which is within the range of 1 to 3 mm, the rebound characteristics of the resulting golf ball are poor and the hit golf ball creates blown-up trajectory, and the flight distance when hit by a driver is not sufficiently obtained.

In Japanese Patent Publication No. 151320/1999, a multi-piece golf ball, of which the center and intermediate layer are formed from rubber composition comprising polybutadiene rubber as a main component, the center has a diameter of 15 to 22 mm and a Shore D hardness of 40 to 70, is described. However, the diameter of the center is too small, and the rebound characteristics of the resulting golf ball are poor. In addition, the spin amount at the time of hitting is large, and the flight distance when hit by a driver is not sufficiently obtained.

There has been no golf ball, which is superior in flight distance, shot feel, controllability (spin performance) and scuff resistance.

OBJECTS OF THE INVENTION

A main object of the present invention is to provide a multi-piece solid golf ball, which is superior in flight distance, controllability, shot feel and scuff resistance.

According to the present invention, the object described above has been accomplished by providing a multi-piece solid golf ball comprising a center, intermediate layer and cover, using polyurethane-based thermoplastic elastomer for the cover, and by adjusting the diameter of the center, the thickness and hardness of the intermediate layer, the hardness difference and specific gravity difference between the intermediate layer and the center, the thickness of the cover, the hardness difference and specific gravity difference between the intermediate layer and the cover to specified ranges, thereby providing a multi-piece solid golf ball, which is superior in flight distance, controllability, shot feel and scuff resistance.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accompanying drawings which are given by way of illustration only, and thus are not limitative of the present invention, and wherein:

FIG. 2 is a schematic cross section illustrating one embodiment of a mold for molding a core of the golf ball of the present invention.

SUMMARY OF THE INVENTION

Figure 1:
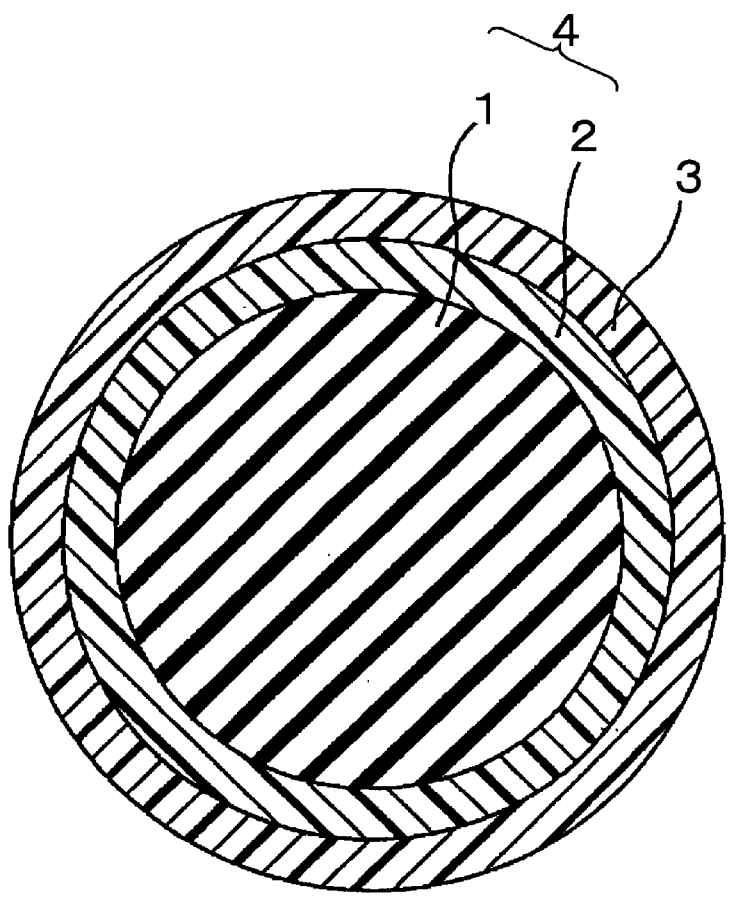
FIG. 1 is a schematic cross section illustrating one embodiment of the golf ball of the present invention.

The present invention provides a multi-piece solid golf ball comprising a core consisting of a center and an intermediate layer formed on the center, and a cover covering the core, wherein the center has a diameter of 37 to 41 mm, the intermediate layer has a thickness of 0.5 to 2.0 mm and a hardness in Shore D hardness of 55 to 70, the hardness of the intermediate layer is higher than a surface hardness in Shore D hardness of the center and a hardness in Shore D hardness of the cover, and a specific gravity of the intermediate layer is lower than that of the center and cover, the cover comprises polyurethane-based thermoplastic elastomer as a main component, and has a thickness of 0.3 to 1.0 mm.

In the present invention, it is required for the cover to comprise polyurethane-based thermoplastic elastomer as a main component. The cover formed by using the polyurethane-based thermoplastic elastomer generally has high strength and excellent spin performance, but the rebound characteristics are degraded. Therefore, in the present invention, it is required for the cover to have a thickness of 0.3 to 1.0 mm, which is smaller than that of the conventional golf ball, in order to restrain the deterioration of the rebound characteristics as small as possible. It is required for the intermediate layer to use a material, which is hard and has high rebound characteristics, in order to further compensate the deterioration of the rebound characteristics. However, when the thickness of the intermediate layer is large, the shot feel of the resulting golf ball is poor. Therefore, it is required for the intermediate layer to have a thickness of 0.5 to 2.0 mm. In the present invention, it can be accomplished to provide the golf ball having long flight distance, good shot feel and excellent controllability by the combination thereof.

DETAILED DESCRIPTION OF THE INVENTION

The multi-piece solid golf ball of the present invention will be explained with reference to the accompanying drawing in detail. FIG. 1 is a schematic cross section illustrating one embodiment of the multi-piece solid golf ball of the present invention. As shown in FIG. 1, the golf ball of the present invention comprises a core 4 consisting of a center 1 and an intermediate layer 2 formed on the center 1, and a cover 3 covering the core 4. The cover may have single-layer structure or multi-layer structure, which has two or more layers. In FIG. 1, in order to explain the golf ball of the present invention simply, a golf ball having one layer of cover 3, that is, a three-piece solid golf ball will be used hereinafter for explanation.

In the core 4, it is desired for the center 1 to comprise polybutadiene rubber as a main component. The center is preferably obtained by press-molding a rubber composition under applied heat. The rubber composition essentially contains polybutadiene, a co-crosslinking agent, an organic peroxide and a filler.

The polybutadiene used for the core 4 of the present invention may be one, which has been conventionally used for cores of solid golf balls. Preferred is high-cis polybutadiene rubber containing a cis-1, 4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent can be a metal salt of $\alpha,\beta$-unsaturated carboxylic acid, including mono or divalent metal salts, such as zinc or magnesium salts of $\alpha,\beta$-unsaturated carboxylic acids having 3 to 8 carbon atoms (e.g. acrylic acid, methacrylic acid, etc.), or a functional monomers (such as trimethylolpropane trimethacrylate, and the like) and the like. The preferred co-crosslinking agent is a zinc salt of $\alpha,\beta$-unsaturated carboxylic acid, particularly zinc acrylate, because it imparts high rebound characteristics to the resulting golf ball. The amount of the co-crosslinking agent is from 10 to 60 parts by weight, preferably from 10 to 50 parts by weight, more preferably from 25 to 40 parts by weight, based on 100 parts by weight of the polybutadiene. When the amount of the co-crosslinking agent is larger than 60 parts by weight, the center is too hard, and the shot feel of the resulting golf ball is poor. On the other hand, when the amount of the co-crosslinking agent is smaller than 10 parts by weight, it is required to increase an amount of the organic peroxide in order to impart a desired hardness to the core, and the rebound characteristics are degraded, which reduces the flight distance.

The organic peroxide includes, for example, dicumyl peroxide, 1,1-bis (t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide is from 0.5 to 5.0 parts by weight, preferably 0.6 to 4.0 parts by weight, more preferably 0.6 to 2.0 parts by weight, based on 100 parts by weight of the polybutadiene. When the amount of the organic peroxide is smaller than 0.5 parts by weight, the center is too soft, and the rebound characteristics of the resulting golf ball are degraded, which reduces the flight distance. On the other hand, when the amount of the organic peroxide is larger than 5.0 parts by weight, it is required to decrease an amount of the co-crosslinking agent in order to impart a desired hardness to the core, and the rebound characteristics are degraded, which reduces the flight distance.

The filler, which can be typically used for the core of solid golf ball, includes for example, inorganic filler (such as zinc oxide, barium sulfate, calcium carbonate, magnesium oxide and the like), high specific gravity metal powder filler (such as tungsten powder, molybdenum powder and the like), and the mixture thereof. The amount of the filler is from 5 to 30 parts by weight, preferably from 5 to 20 parts by weight, based on 100 parts by weight of the polybutadiene. When the amount of the filler is smaller than 5 parts by weight, it is difficult to adjust the weight of the resulting golf ball. On the other hand, when the amount of the filler is larger than 30 parts by weight, the weight ratio of the rubber component in the center is small, and the rebound characteristics reduce too much.

The rubber compositions for the center of the golf ball of the present invention can contain other components, which have been conventionally used for preparing the core of solid golf balls, such as organic sulfide compound or antioxidant. If used, the amount is preferably 0.2 to 5.0 parts by weight, preferably 0.3 to 4.0 parts by weight, more preferably 0.5 to 2.0 parts by weight, based on 100 parts by weight of the polybutadiene.

The process of producing the two-layer structured core 4 of the golf ball of the present invention will be explained with reference to FIG. 2. FIG. 2 is a schematic cross section illustrating one embodiment of a mold for molding a core of the golf ball of the present invention. The rubber composition for the center is press molded, for example, at 140 to 180° C. for 10 to 60 minutes in a mold to form a vulcanized spherical center. The composition for the intermediate layer is then molded by injection-molding to obtain a semi-spherical half-shell 5 for the intermediate layer. The vulcanized center 7 is covered with the two semi-spherical half-shells 5 for the intermediate layer, and then vulcanized by integrally press-molding, for example, at 140 to 180° C. for 10 to 60 minutes in a mold 6 for molding a core, which is composed of an upper mold and a lower mold, as described in FIG. 2 to obtain the core 4. The core 4 is composed of the center 1 and the intermediate layer 2 formed on the center.

In the golf ball of the present invention, it is required for the center 1 to have a diameter of 37 to 41 mm, preferably 37 to 40 mm, more preferably 38 to 40 mm. When the diameter of the center is smaller than 37 mm, the spin amount at the time of hitting of the resulting golf ball is increased, and the hit golf ball creates blown-up trajectory, which reduces the flight distance. In addition, the rebound characteristics are degraded. On the other hand, when the diameter of the center is larger than 41 mm, the thickness of the intermediate layer or the cover is too small, and the technical effects accomplished by the presence of the intermediate layer or the cover are not sufficiently obtained.

In the golf ball of the present invention, it is desired for the center 1 to have a surface hardness in Shore D hardness of 30 to 65, preferably 35 to 60, more preferably 40 to 60. When the surface hardness is lower than 30, the center is too soft, and the rebound characteristics are degraded. On the other hand, when the surface hardness is higher than 65, the shot feel is hard and poor. The term "a surface hardness of the center" as used herein refers to the hardness, which is determined by measuring a hardness at the surface of the center prepared by press molding as described above, that is, at the surface of the center before covering with the intermediate layer. The term "a central point hardness of the center" as used herein refers to the hardness, which is determined by cutting the resulting center into two equal parts and then measuring a hardness at its central point in section.

In the golf ball of the present invention, it is desired for the center 1 to have a deformation amount when applying from an initial load of 98 N to a final load of 1275 N of 2.2 to 4.0 mm, preferably 2.5 to 3.7 mm, more preferably 2.8 to 3.5 mm. When the deformation amount of the center is smaller than 2.2 mm, the core is too hard, and the shot feel of the resulting golf ball is poor. On the other hand, when the deformation amount is larger than 4.0 mm, the core is too soft, and the durability of the resulting golf ball is poor. In addition, the rebound characteristics are degraded, which reduces the flight distance.

In the golf ball of the present invention, it is desired for the center 1 to have a specific gravity of 1.1 to 1.4, preferably 1.1 to 1.3, more preferably 1.1 to 1.2. When the specific gravity of the center is smaller than 1.1, the weight of the resulting golf ball is light, and the hit golf ball creates weak trajectory, which reduces the flight distance. On the other hand, when the specific gravity is larger than 1.4, the weight of the resulting golf ball is too large, and it is difficult to adjust the weight of the golf ball in accordance with the regulations for golf balls. The term "a specific gravity of the center 1" as used herein refers to the specific gravity, which is determined by measuring a specific gravity with a sample of the center cutting from molded golf ball. The intermediate layer 2 is then formed on the center 1.

In the golf ball of the present invention, it is required for the intermediate layer 2 to have a thickness of 0.5 to 2.0 mm, preferably 0.5 to 1.6 mm, more preferably 0.7 to 1.4 mm. When the thickness is smaller than 0.5 mm, the technical effect of the hardness of the intermediate layer is not sufficiently obtained, and the spin amount at the time of hitting can not be sufficiently restrained. On the other hand, when the thickness is larger than 2.0 mm, since the intermediate layer is formed from a relatively hard material, the shot feel is hard and poor.

In the golf ball of the present invention, it is required that a hardness in Shore D hardness of the intermediate layer 2 be higher than the surface hardness of the center 1. When the hardness difference between the intermediate layer and the surface of the center is too large, the center is too soft or the intermediate layer is too hard, which reduces the flight distance or degrades the durability. On the other hand, when the hardness difference is too small, that is, the hardness difference in the core, which is formed by covering the intermediate layer, is small, the spin amount at the time of hitting is increased, and the hit golf ball creates blown-up trajectory, which reduces the flight distance. Therefore, the hardness difference is preferably 2 to 20, more preferably 3 to 18, most preferably 5 to 15. It is desired for the hardness difference between the surface and the central point of the center to be not less than 10, preferably not less than 15, in order to increase the hardness difference in the core comprising the intermediate layer to restrain the spin amount at the time of hitting, and increase the flight distance.

In the golf ball of the present invention, it is required for the intermediate layer 2 to have a hardness in Shore D hardness of 55 to 70, preferably 57 to 70, more preferably 60 to 68. When the hardness is lower than 55, the rebound characteristics of the resulting golf ball are degraded, which reduces the flight distance. On the other hand, when the hardness is higher than 70, the shot feel is hard and poor. In addition, the scuff resistance is poor. The term "a surface hardness of the intermediate layer" as used herein refers to the hardness, which is determined by measuring a hardness (slab hardness) using a sample of a stack of the three or more heat and press molded sheets having a thickness of about 2 mm from each intermediate layer composition, which had been stored at 23° C. for 2 weeks.

In the golf ball of the present invention, it is required for the specific gravity of the intermediate layer 2 to be lower than that of the center 1. The specific gravity difference between the intermediate layer and the center is preferably within the range of 0.05 to 0.3, more preferably 0.05 to 0.25, most preferably 0.1 to 0.25. When the specific gravity difference is smaller than 0.05, the specific gravity of the center is relatively small, and the moment of inertia of the resulting golf ball is large. Therefore, the spin performance is degraded, and the controllability is degraded. On the other hand, when the specific gravity difference is larger than 0.3, the specific gravity of the center is too large, and it is difficult to adjust the weight of the golf ball in accordance with the regulations for golf balls.

In the golf ball of the present invention, it is desired for the intermediate layer 2 to have a specific gravity of not more than 1.10, preferably not more than 1.08, more preferably not more than 1.05. When the specific gravity of the intermediate layer is larger than 1.10, it is required to relatively decrease the specific gravity of the center, and the moment of inertia of the resulting golf ball is too large, which degrades the controllability.

As the materials used in the intermediate layer 2 of the present invention, which is not limited, ionomer resin may be suitably used in view of high rigidity and high rebound characteristics. The ionomer resin may be a copolymer of α-olefin and α,β-unsaturated carboxylic acid having 3 to 8 carbon atoms, of which a portion of carboxylic acid groups is neutralized with metal ion, a terpolymer of ethylene, α,β-unsaturated carboxylic acid and α,β-unsaturated carboxylic acid ester, of which a portion of carboxylic acid groups is neutralized with metal ion, or mixtures thereof. Examples of the α-olefin in the ionomer preferably include ethylene and propylene. Examples of the α,β-unsaturated carboxylic acid in the ionomer include acrylic acid, methacrylic acid, fumaric acid, maleic acid, crotonic acid and the like, and preferred are acrylic acid and methacrylic acid. Examples of the α,β-unsaturated carboxylic acid ester in the ionomer include methyl ester, ethyl ester, propyl ester, n-butyl ester and isobutyl ester of acrylic acid, methacrylic acid, fumaric acid, maleic acid, crotonic acid and the like. Preferred are acrylic acid esters and methacrylic acid esters. The metal ion which neutralizes a portion of carboxylic acid groups of the copolymer or terpolymer includes alkaline metal ion, such as sodium ion, potassium ion, lithium ion and the like; divalent metal ion, such as zinc ion, calcium ion, magnesium ion, and the like; trivalent metal ion, such as aluminum ion, neodymium ion, and the like; and the mixture thereof. Preferred are sodium ions, zinc ions, lithium ions and the like, in view of rebound characteristics, durability and the like. Sodium ion, zinc ion, lithium ion and the like is typically used, because of the rebound characteristics, durability and the like.

The ionomer resin is not limited, but examples thereof will be shown by a trade name thereof. Examples of the ionomer resins, which are commercially available from Du Pont-Mitsui Polychemicals Co., Ltd. include Hi-milan 1555, Hi-milan 1557, Hi-milan 1601, Hi-milan 1605, Hi-milan 1652, Hi-milan 1702, Hi-milan 1705, Hi-milan 1706, Hi-milan 1707, Hi-milan 1855, Hi-milan 1856 and the like. Examples of the ionomer resins, which are commercially available from Du Pont Co., include Surlyn 8945, Surlyn 9945 and the like. Examples of the ionomer resins, which are commercially available from Exxon Chemical Co., include Iotek 7010, Iotek 8000 and the like. These ionomer resins may be used alone or in combination.

As the materials suitably used in the intermediate layer 2 of the present invention, the above ionomer resin may be used alone, but the ionomer resin may be used in combination with thermoplastic elastomer. Examples of the thermoplastic elastomers are not limited, but include polyurethane-based elastomer, polyamide-based thermoplastic elastomer, polyester-based thermoplastic elastomer, styrene-based thermoplastic elastomer, polyolefin-based thermoplastic elastomer and the like.

Examples of the thermoplastic elastomers, which are commercially available, include polyurethane-based thermoplastic elastomer, which is commercially available from BASF Polyurethane Elastomers Co., Ltd. under the trade name of "Elastollan" (such as "Elastollan ET880"); polyamide-based thermoplastic elastomer, which is commercially available from Atofina Japan Co., Ltd. under the trade name of "Pebax" (such as "Pebax 2533"); polyester-based thermoplastic elastomer, which is commercially available from Toray-Du Pont Co., Ltd. under the trade name of "Hytrel" (such as "Hytrel 3548", "Hytrel 4047"); (trade name), styrene-based thermoplastic elastomer, which is commercially available from Mitsubishi Chemical Co., Ltd. under the trade name of "Rabalon" (such as "Rabalon SR04"); olefin-based thermoplastic elastomer available from Mitsubishi Chemical Co., Ltd. under the trade name "Thermoran" (such as "Thermoran 3981N"); and the like.

A method of forming on the center 1 with the intermediate layer 2 is not specifically limited, but may be conventional methods, which have been known to the art and used for forming the cover of the golf balls. For example, there can be used a method comprising molding the cover composition into a semi-spherical half-shell in advance, covering the core with the two half-shells, followed by press molding at 130 to 170° C. for 1 to 5 minutes, or a method comprising injection molding the intermediate layer composition directly on the center, which is covered with the cover, to cover it. The intermediate layer 3 is formed on the center 1 to form the core 4 having two-layer structure by using the above method.

In the golf ball of the present invention, it is desired for the core 4 to have a deformation amount when applying from an initial load of 98 N to a final load of 1275 N of 2.0 to 3.7 mm, preferably 2.2 to 3.5 mm, more preferably 2.5 to 3.3 mm. When the deformation amount of the core is smaller than 2.0 mm, the core is too hard, and the shot feel of the resulting golf ball is poor. On the other hand, when the deformation amount is larger than 3.7 mm, the core is too soft, and the durability of the resulting golf ball is poor. In addition, the rebound characteristics are degraded, which reduces the flight distance.

At least one layer of cover 3 are then covered on the core 4. In the golf ball of the present invention, it is required for the cover 3 to have a thickness of 0.3 to 1.0 mm, preferably 0.4 to 0.9 mm, more preferably 0.4 to 0.8 mm. When the thickness is smaller than 0.3 mm, the technical effects accomplished by softening the cover are not sufficiently obtained, and the spin amount at short iron shot to approach shot is small, which degrades the controllability. On the other hand, when the thickness of the cover is larger than 1.0 mm, the rebound characteristics of the resulting golf ball are degraded and the spin amount at the time of hitting is increased, and the hit golf ball creates blown-up trajectory, which reduces the flight distance.

In the golf ball of the present invention, it is required that the hardness in Shore D hardness of the cover 3 be lower than that of the intermediate layer 2, and the hardness difference between the intermediate layer and cover is preferably within the range of 8 to 40, more preferably 10 to 40, most preferably 15 to 35. When the hardness difference between the intermediate layer and the cover is smaller than 8, the hardness of the cover is too high or that of the intermediate layer is too low, and the controllability at approach shot is poor or the flight performance is degraded. On the other hand, when the hardness difference is larger than 40, the hardness of the cover is too low or that of the intermediate layer is too high, and the flight distance is degraded or the shot feel is poor.

In the golf ball of the present invention, it is required for the cover 3 to have a hardness in Shore D hardness of 30 to 55, preferably 33 to 52, more preferably 35 to 50. When the hardness of the cover 3 is lower than 30, the spin amount at the time of hitting by a driver or middle iron club is increased, and the hit golf ball creates blown-up trajectory, which reduces the flight distance. On the other hand, when the hardness of the cover is higher than 55, the spin amount at the time of hitting by a short iron club is decreased, and the controllability is poor. In addition, the shot feel is poor. The term "a hardness of the cover" as used herein is determined by measuring a hardness (slab hardness) using a sample of a stack of the three or more heat and press molded sheets having a thickness of about 2 mm from the composition for the cover, which had been stored at 23° C. for 2 weeks.

In the golf ball of the present invention, it is required that the hardness of the intermediate layer 2 be higher than that of the cover 3 as described above. In the golf ball of the present invention, the center 1 has low hardness in order to accomplish good shot feel at the time of hitting by a driver or middle iron club and the cover 3 has low hardness in order to accomplish good durability at approach shot, and the rebound characteristics are degraded. It is required that the hardness of the intermediate layer 2 be higher than that of the cover 3 in order to compensate the deterioration of the rebound characteristics thereby. Therefore, it is required to use a material, which is hard and has high rebound characteristics, for the intermediate layer.

In the golf ball of the present invention, it is required that a specific gravity of the intermediate layer 2 be lower than that of the cover 3, and the specific gravity difference between the intermediate layer and cover is preferably within the range of 0.05 to 0.30, more preferably 0.07 to 0.25, most preferably 0.1 to 0.2. When the specific gravity difference is smaller than 0.05, the specific gravity of the center is relatively small, and the moment of inertia of the resulting golf ball is large, which degrades the controllability. On the other hand, when the specific gravity difference is larger than 0.3, it is required to add a large amount of specific gravity adjuster in order to increase the specific gravity of the cover, and the rebound characteristics are degraded.

In the golf ball of the present invention, it is desired for the cover 3 to have a specific gravity of 1.00 to 1.30, preferably 1.00 to 1.25, more preferably 1.05 to 1.25. When the specific gravity is larger than 1.30, the moment of inertia of the resulting golf ball is too large, which degrades the controllability. On the other hand, when the specific gravity is smaller than 1.00, the moment of inertia of the resulting golf ball is too small, which reduces the flight distance.

In the golf ball of the present invention, it is desired for the cover to comprise polyurethane-based thermoplastic elastomer as a main component in view of scuff resistance, preferably polyurethane-based thermoplastic elastomer formed by using cycloaliphatic diisocyanate in view of rebound characteristics, scuff resistance, yellowing resistance and the like.

Examples of the cycloaliphatic diisocyanates include one or combination of two or more selected from the group consisting of 4,4'-dicyclohexylmethane diisocyanate ($H_{12}MDI$), which is hydrogenated compound of 4,4'-diphenylmethane diisocyanate (MDI); 1,3-bis (isocyanatomethyl)cyclohexane ($H_6XDI$), which is hydrogenated compound of xylylene diisocyanate (XDI); isophorone diisocyanate (IPDI); and trans-1,4-cyclohexane diisocyanate (CHDI). Preferred is the $H_{12}MDI$ in view of general-purpose properties and processability.

Examples of the polyurethane-based thermoplastic elastomers include polyurethane-based thermoplastic elastomer formed by using the $H_{12}MDI$, which is commercially available from BASF Polyurethane Elastomers Co., Ltd. under the trade name "Elastollan" (such as "Elastollan XNY90A", "Elastollan XNY97A", "Elastollan XNY585") and the like.

As the materials used in the cover 3 of the present invention, the above polyurethane-based thermoplastic elastomer may be used alone, but the polyurethane-based thermoplastic elastomer may be used in combination with at least one of the other thermoplastic elastomer, diene-based block copolymer, ionomer resin and the like. Examples of the other thermoplastic elastomers include the other polyurethane-based thermoplastic elastomer, polyamide-based thermoplastic elastomer, polyester-based thermoplastic elastomer, polystyrene-based thermoplastic elastomer, polyolefin-based thermoplastic elastomer and the like. The other thermoplastic elastomer may have functional group, such as carboxyl group, glycidyl group, sulfone group, epoxy group and the like.

Examples of the other thermoplastic elastomers include polyurethane-based elastomer, which is commercially available from BASF Polyurethane Elastomers Co., Ltd. under the trade name of "Elastollan" (such as "Elastollan ET880"); polyamide-based thermoplastic elastomer, which is commercially available from Atofina Japan Co., Ltd. under the trade name of "Pebax" (such as "Pebax 2533"); polyester-based thermoplastic elastomer, which is commercially available from Toray-Du Pont Co., Ltd. under the trade name of "Hytrel" (such as "Hytrel 3548", "Hytrel 4047"); styrene-based thermoplastic elastomer, which is commercially available from Mitsubishi Chemical Co., Ltd. under the trade name of "Rabalon" (such as "Rabalon SR04"); olefin-based thermoplastic elastomer available from Mitsubishi Chemical Co., Ltd. under the trade name "Thermoran" (such as "Thermoran 3981N"); and the like.

The diene-based block copolymer is a block copolymer or partially hydrogenated block copolymer having double bond derived from conjugated diene compound. The base bock copolymer is block copolymer composed of block polymer block A mainly comprising at least one aromatic vinyl compound and polymer block B mainly comprising at least one conjugated diene compound. The partially hydrogenated block copolymer is obtained by hydrogenating the block copolymer. Examples of the aromatic vinyl compounds comprising the block copolymer include styrene, α-methyl styrene, vinyl toluene, p-t-butyl styrene, 1,1-diphenyl styrene and the like, or mixtures thereof. Preferred is styrene. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof. Examples of the diene block copolymers include an SBS (styrene-butadiene-styrene) block copolymer having polybutadiene block with epoxy groups or SIS (styrene-isoprene-styrene) block copolymer having polyisoprene block with epoxy groups and the like. Examples of the diene block copolymers, which is commercially available, include the diene block copolymers, which are commercially available from Daicel Chemical Industries, Ltd. under the trade name of "Epofriend" (such as "Epofriend A1010"), the diene-based block copolymers, which are commercially available from Kuraray Co., Ltd. under the trade name of "Septon" (such as "Septon HG-252" and the like) and the like.

As the above ionomer resin, ionomer resin, which is the same as used in the intermediate layer, may be used.

The amount of the other thermoplastic elastomer, diene block copolymer or ionomer resin is 0 to 40 parts by weight, preferably 0 to 30 parts by weight, based on 100 parts by weight of the base resin for the cover. When the amount is larger than 40 parts by weight, either scuff resistance, rebound characteristics or yellowing resistance are degraded.

The composition for the cover 3 used in the present invention may optionally contain pigments (such as titanium dioxide, etc.) and the other additives such as a dispersant, an antioxidant, a UV absorber, a photostabilizer and a fluorescent agent or a fluorescent brightener, etc., in addition to the resin component as long as the addition of the additives does not deteriorate the desired performance of the golf ball cover. If used, the amount of the pigment is preferably 0.1 to 5.0 parts by weight, based on 100 parts by weight of the base resin for the cover.

A method of covering on the core 4 with the cover 3 is not specifically limited, but may be a conventional method. For example, there can be used a method comprising molding the cover composition into a semi-spherical half-shell in advance, covering the core with the two half-shells, followed by press molding at 130 to 170° C. for 1 to 5 minutes, or a method comprising injection molding the cover composition directly on the core, which is covered with the cover, to cover it.

In the present invention, it is desired for the golf ball to have a deformation amount when applying from an initial load of 98 N to a final load of 1275 N of 2.0 to 3.5 mm, preferably 2.2 to 3.2 mm, more preferably 2.4 to 3.0 mm. When the deformation amount of the golf ball is smaller than 2.0 mm, the golf ball is too hard, and the shot feel is hard and poor. On the other hand, when the deformation amount is larger than 3.5 mm, the golf ball is too soft, and the shot feel is poor such that the rebound characteristics are poor. In addition, the rebound characteristics are degraded, which reduces the flight distance.

At the time of molding the cover, many depressions called "dimples" are formed on the surface of the golf ball. Furthermore, paint finishing or marking with a stamp may be optionally provided after the cover is molded for commercial purposes.

The golf ball of the present invention is formed, so that it has a diameter of not less than 42.67 mm (preferably 42.67 to 42.82 mm) and a weight of not more than 45.93 g, in accordance with the regulations for golf balls.

The diameter of golf balls is limited to not less than 42.67 mm in accordance with the regulations for golf balls as described above. Generally, when the diameter of the golf ball is large, air resistance of the golf ball on a flight is large, which reduces the flight distance. Therefore, most of golf balls commercially available are designed to have a diameter of 42.67 to 42.82 mm. The present invention is applicable to the golf balls having the diameter. There are golf balls having large diameter in order to improve the easiness of hitting. In addition, there are cases where golf balls having a diameter out of the regulations for golf balls are required depending on the demand and object of users. Therefore, it can be considered for golf balls to have a diameter of 42 to 44 mm, more widely 40 to 45 mm. The present invention is also applicable to the golf balls having the diameter.

EXAMPLES

The following Examples and Comparative Examples further illustrate the present invention in detail but are not to be construed to limit the scope of the present invention.

(i) Production of Center

The rubber compositions for the center having the formulation shown in Table 1 (Examples) and Table 2 (Comparative Examples) were mixed, and then vulcanized by press-molding in the mold at 170° C. for 15 minutes to obtain spherical centers. The diameter, weight, deformation amount, surface hardness ($K_1$) in Shore D hardness and specific gravity ($M_1$) of the resulting centers were measured. The results are shown in Table 3 (Examples) and Table 4 (Comparative Examples).

Preparation of Compositions for Intermediate Layer and Cover

The formulation materials for the intermediate layer and cover shown in Table 1 (Examples) and Table 2 (Comparative Examples) were mixed using a kneading type twin-screw extruder to obtain pelletized cover compositions. The extrusion condition was, a screw diameter of 45 mm, a screw speed of 200 rpm, and a screw L/D of 35.

The formulation materials were heated at 160 to 260° C. at the die position of the extruder. The specific gravity and Shore D hardness were measured, using a sample of a stack of the three or more heat and press molded sheets having a thickness of about 2 mm from each intermediate layer composition and each cover composition, which had been stored at 23° C. for 2 weeks. The results are shown in Table 3 (Examples) and Table 4 (Comparative Examples) as the Shore D hardness of the intermediate layer ($K_2$), Shore D hardness of the cover ($K_3$), specific gravity of the intermediate layer ($M_2$) and specific gravity of the cover ($M_3$). The hardness differences ($K_2-K_1$) and ($K_2-K_3$), and the specific gravity differences ($M_1-M_2$) and ($M_2-M_3$) were determined by calculating from the above values of $K_1$, $K_2$, $K_3$, $M_1$, $M_2$ and $M_3$, and the result is shown in the same Tables.

(ii) Production of Semi-Spherical Half-Shells for the Intermediate Layer

The compositions for the intermediate layer having the formulation shown in Table 1 (Examples) and Table 2 (Comparative Examples) were injection-molded to obtain semi-spherical half-shells 5 for the intermediate layer.

(iii) Production of Core

The vulcanized molded articles 7 for the center produced in the step (i) were covered with the two semi-spherical half-shells 5 for the intermediate layer produced in the step (ii) and then press-molded in the mold shown in FIG. 2 at 150° C. for 3 minutes to obtain two-layer structured cores 4. The thickness of the intermediate layer, the weight, diameter and deformation amount of the resulting two-layer structured core were measured. The results are shown in Table 3 (Examples) and Table 4 (Comparative Examples).

TABLE 1

(parts by weight)

| Composition | Example No. | | | | | |
|---|---|---|---|---|---|---|
| | 1 | 2 | 3 | 4 | 5 | 6 |
| (Center composition) | | | | | | |
| BR11 *1 | 100 | 100 | 100 | 100 | 100 | 100 |
| Zinc acrylate | 33 | 33 | 35 | 31 | 33 | 33 |
| Zinc oxide | 16 | 16 | 15 | 17 | 16 | 19 |
| Dicumyl peroxide | 1.0 | 1.0 | 1.0 | 1.0 | 1.0 | 1.0 |
| Diphenyl disulfide | 0.5 | 0.5 | 0.5 | 0.5 | 0.5 | 0.5 |
| (Intermediate layer composition) | | | | | | |
| Surlyn 8945 *2 | 50 | 45 | 50 | 50 | 50 | 45 |
| Surlyn 9945 *3 | 50 | 45 | 50 | 50 | 50 | 45 |
| Rabalon SR04 *4 | — | 10 | — | — | — | 10 |
| Cover composition | | | | | | |
| Elastollan XNY90A *5 | 100 | 50 | 100 | 100 | — | — |
| Elastollan XNY97A *6 | — | 50 | — | — | — | — |
| Elastollan XNY585 *7 | — | — | — | — | 100 | 100 |
| Titanium dioxide | 4 | 4 | 4 | 4 | 4 | 4 |

TABLE 2

(parts by weight)

| Composition | Comparative Example No. | | | |
|---|---|---|---|---|
| | 1 | 2 | 3 | 4 |
| (Center composition) | | | | |
| BR11 *1 | 100 | 100 | 100 | 100 |
| Zinc acrylate | 33 | 33 | 33 | 33 |
| Zinc oxide | 24 | 20 | 16 | 12 |
| Dicumyl peroxide | 1.0 | 1.0 | 1.0 | 1.0 |
| Diphenyl disulfide | 0.5 | 0.5 | 0.5 | 0.5 |
| (Intermediate layer composition) | | | | |
| Surlyn 8945 *2 | 45 | 45 | 35 | — |
| Surlyn 9945 *3 | 45 | 45 | 35 | — |
| Rabalon SR04 *4 | 10 | 10 | 30 | |
| Cover composition | | | | |
| Elastollan XNY90A *5 | 100 | 100 | 100 | 100 |
| Elastollan XNY97A *6 | — | — | — | — |
| Elastollan XNY585 *7 | — | — | — | — |
| Titanium dioxide | 4 | 4 | 4 | 4 |

*1: BR-11 (trade name), high-cis polybutadiene commercially available from JSR Co., Ltd. (Content of 1,4-cis-polybutadiene: 96%)
*2: Surlyn 8945 (trade name), ethylene-methacrylic acid copolymer ionomer resin obtained by neutralizing with sodium ion, manufactured by Du Pont Co.
*3: Surlyn 9945 (trade name), ethylene-methacrylic acid copolymer ionomer resin obtained by neutralizing with zinc ion, manufactured by Du Pont Co.
*4: Rabalon SR04 (trade name), styrene-based (SEBS) thermoplastic elastomer, manufactured by Mitsubishi Chemical Co., Ltd.
*5: Elastollan XNY90A (trade name), polyurethane-based thermoplastic elastomer formed by using 4,4'-dicyclohexylmethane diisocyanate ($H_{12}$MDI) (=hydrogenated MDI), commercially available from BASF Polyurethane Elastomers Co., Ltd.
*6: Elastollan XNY97A (trade name), polyurethane-based thermoplastic elastomer formed by using 4,4'-dicyclohexylmethane diisocyanate ($H_{12}$MDI) (=hydrogenated MDI), commercially available from BASF Polyurethane Elastomers Co., Ltd.
*7: Elastollan XNY585 (trade name), polyurethane-based thermoplastic elastomer formed by using 4,4'-dicyclohexylmethane diisocyanate ($H_{12}$MDI) (=hydrogenated MDI), commercially available from BASF Polyurethane Elastomers Co., Ltd.

Examples 1 to 6 and Comparative Examples 1 to 4

The cover composition was injection molded to obtain semi-spherical half-shell for the cover as described in the intermediate layer. The two-layer structured core produced in the step (iii) was covered with the two semi-spherical half-shells for the cover and then press-molded in the mold at 150° C. for 3 minutes to form a cover layer having a thickness shown in Table 3 (Examples) and Table 4 (Comparative Examples). Then, clear paint was applied on the surface to produce golf ball having a diameter of 42.7 mm and a weight of 45.3 g. In Comparative Example 4, it is a golf ball having one-layer structured core, which comprises no intermediate layer, that is, a two-piece golf ball. With respect to the resulting golf balls, the deformation amount, coefficient of restitution, flight performance, shot feel, controllability and scuff resistance were measured or evaluated. The results are shown in Table 5 (Examples) and Table 6 (Comparative Examples). The test methods are as follows.

(Test Method)

(1) Hardness of Center

The surface hardness of the center is determined by measuring a Shore D hardness at the surface of the center prepared. The central point hardness of the center is determined by measuring a Shore D hardness at the central point of the center in section, after the center is cut into two equal parts. Shore D hardness is measured with a Shore D hardness meter according to ASTM-D 2240.

(2) Hardness of Intermediate Layer and Cover

The hardness of the intermediate layer and the hardness of the cover are determined by measuring a hardness, using a sample of a stack of the three or more heat and press molded sheets having a thickness of about 2 mm from each intermediate layer composition and each cover composition, which had been stored at 23° C. for 2 weeks, with a Shore D hardness meter according to ASTM D-2240-68.

(3) Deformation Amount

The deformation amount of was determined by measuring a deformation amount when applying from an initial load of 98 N to a final load of 1275 N on the center, core or golf ball.

(4) Coefficient of Restitution

A cylindrical aluminum projectile having weight of 200 g was struck at a speed of 45 m/sec against a golf ball, and the velocity of the projectile and the golf ball before and after the strike were measured. The coefficient of restitution of the golf ball was calculated from the velocity and the weight of both the projectile and the golf ball.

(5) Flight Performance

After a No. 1 wood club (a driver, W#1; "XXIO" loft angle=8 degrees, X shaft, manufactured by Sumitomo Rubber Industries, Ltd.) having metal head was mounted to a swing robot manufactured by Golf Laboratory Co. and each golf ball was hit at head speed of 50 m/sec, the initial velocity and spin amount (backspin amount) immediately after hitting, and flight distance were measured. As the flight distance, total that is a distance to the stop point of the hit golf ball was measured. The measurement was conducted 12 times for each golf ball (n=12), and the average is shown as the result of the golf ball.

(6) Shot Feel

The shot feel of the golf ball is evaluated by 10 golfers according to a practical hitting test using a No. 1 wood club (W#1, a driver) having a metal head. The evaluation criteria are as follows. The results shown in the Tables below are based on the fact that the most golfers evaluated with the same criterion about shot feel.

Evaluation Criteria

○: The golfers felt that the golf ball has good shot feel such that impact force at the time of hitting is small and the rebound characteristics are good.

Δ: The golfers felt that the golf ball has fairly good shot feel.

x: The golfers felt that the golf ball has poor shot feel such that impact force at the time of hitting is large or has heavy and poor shot feel.

(7) Controllability

The controllability of the golf ball is evaluated by 10 golfers according to a practical hitting test using a pitting wedge (PW). The evaluation criteria are as follows. The results shown in the Tables below are based on the fact that the most golfers evaluated with the same criterion about controllability.

Evaluation Criteria

○: The golfers felt that it is easy to apply spin on the golf ball, and the golf ball has good controllability.

Δ: The golfers felt that the golf ball has fairly good controllability.

x: The golfers felt that it is difficult to apply spin on the golf ball such that the golf ball slips on the face of golf club, and the golf ball has poor controllability.

(8) Scuff Resistance

After a pitching wedge (PW; "Newbreed Tour Forged", manufactured by Sumitomo Rubber Industries, Ltd.) commercially available was mounted to a swing robot manufactured by True Temper Co., two points on the surface of each golf ball was hit at a head speed of 36 m/sec one time for each point. The two points were evaluated by checking the surface appearance by visual observation. The evaluation criteria are as follows.

Evaluation Criteria

○: The surface of the golf ball slightly has a cut, but it is not particularly noticeable.

Δ: The surface of the golf ball clearly has a cut, and the surface becomes fluffy.

x: The surface of the golf ball is considerably chipped off, and the surface noticeably becomes fluffy.

TABLE 3

| | (Test results) | | | | | |
| --- | --- | --- | --- | --- | --- | --- |
| | | | Example No. | | | |
| Test item | 1 | 2 | 3 | 4 | 5 | 6 |
| (Center) | | | | | | |
| Diameter (mm) | 39.5 | 39.5 | 39.5 | 39.5 | 39.5 | 38.7 |
| Weight (g) | 36.9 | 36.9 | 36.9 | 36.9 | 36.9 | 35.3 |
| Deformation amount (mm) | 3.1 | 3.1 | 2.9 | 3.3 | 3.1 | 3.0 |
| Surface hardness ($K_1$) | 58 | 58 | 59 | 57 | 58 | 58 |
| Specific gravity ($M_1$) | 1.14 | 1.14 | 1.14 | 1.14 | 1.14 | 1.16 |
| (Intermediate layer) | | | | | | |
| Thickness (mm) | 0.8 | 0.8 | 0.8 | 0.8 | 1.2 | 1.6 |
| Shore D hardness ($K_2$) | 64 | 60 | 64 | 64 | 64 | 60 |
| Difference ($K_2 - K_1$) | 6 | 2 | 5 | 7 | 6 | 2 |
| Specific gravity ($M_2$) | 0.96 | 0.95 | 0.96 | 0.96 | 0.96 | 0.95 |
| Difference ($M_1 - M_2$) | 0.18 | 0.19 | 0.18 | 0.18 | 0.18 | 0.21 |

TABLE 3-continued (Test results)

| | Example No. | | | | | |
|---|---|---|---|---|---|---|
| Test item | 1 | 2 | 3 | 4 | 5 | 6 |
| (Core) | | | | | | |
| Weight (g) | 40.6 | 40.6 | 40.6 | 40.6 | 42.9 | 42.9 |
| Diameter (mm) | 41.1 | 41.1 | 41.1 | 41.1 | 41.9 | 41.9 |
| Deformation amount (mm) | 2.8 | 2.9 | 2.7 | 3.0 | 2.7 | 2.6 |
| (Cover) | | | | | | |
| Thickness (mm) | 0.8 | 0.8 | 0.8 | 0.8 | 0.4 | 0.4 |
| Shore D hardness ($K_3$) | 44 | 46 | 44 | 44 | 42 | 42 |
| Difference ($K_2 - K_3$) | 20 | 14 | 20 | 20 | 22 | 18 |
| Specific gravity ($M_3$) | 1.10 | 1.10 | 1.10 | 1.10 | 1.17 | 1.17 |
| Difference ($M_3 - M_2$) | 0.14 | 0.15 | 0.14 | 0.14 | 0.21 | 0.22 |

TABLE 4

| | Comparative Example No. | | | |
|---|---|---|---|---|
| Test item | 1 | 2 | 3 | 4 |
| (Center) | | | | |
| Diameter (mm) | 36.4 | 36.4 | 39.5 | 41.1 |
| Weight (g) | 29.9 | 29.2 | 36.9 | 40.6 |
| Deformation amount (mm) | 3.0 | 3.1 | 3.1 | 3.0 |
| Surface hardness ($K_1$) | 58 | 58 | 58 | 58 |
| Specific gravity ($M_1$) | 1.19 | 1.17 | 1.14 | 1.12 |
| (Intermediate layer) | | | | |
| Thickness (mm) | 2.4 | 1.6 | 0.8 | — |
| Shore D hardness ($K_2$) | 60 | 60 | 50 | — |
| Difference ($K_2 - K_1$) | 2 | 2 | −8 | — |
| Specific gravity ($M_2$) | 0.95 | 0.95 | 0.94 | — |
| Difference ($M_1 - M_2$) | 0.24 | 0.22 | 0.20 | — |
| (Core) | | | | |
| Weight (g) | 40.6 | 36.1 | 40.6 | — |
| Diameter (mm) | 41.1 | 39.5 | 41.1 | — |
| Deformation amount (mm) | 2.5 | 2.7 | 3.0 | — |
| (Cover) | | | | |
| Thickness (mm) | 0.8 | 1.6 | 0.8 | 0.8 |
| Shore D hardness ($K_3$) | 44 | 44 | 44 | 44 |
| Difference ($K_2 - K_3$) | 16 | 16 | 6 | — |
| Specific gravity ($M_3$) | 1.10 | 1.10 | 1.10 | 1.10 |
| Difference ($M_3 - M_2$) | 0.15 | 0.15 | 0.16 | — |

TABLE 5

| | Example No. | | | | | |
|---|---|---|---|---|---|---|
| Test item | 1 | 2 | 3 | 4 | 5 | 6 |
| (Golf ball) | | | | | | |
| Deformation amount (mm) | 2.7 | 2.8 | 2.6 | 2.9 | 2.7 | 2.6 |
| Coefficient of restitution | 0.768 | 0.765 | 0.772 | 0.765 | 0.770 | 0.765 |
| Flight performance (W#1; 50 m/sec) | | | | | | |
| Spin amount (rpm) | 2580 | 2650 | 2620 | 2550 | 2500 | 2460 |
| Total (m) | 252 | 250 | 253 | 252 | 255 | 253 |
| Shot feel | ◯ | ◯ | ◯ | ◯ | ◯ | ◯ |
| Controllability | ◯ | ◯ | ◯ | ◯ | ◯ | ◯ |
| Scuff resistance | ◯ | ◯ | ◯ | ◯ | ◯ | ◯ |

TABLE 6

| | Comparative Example No. | | | |
|---|---|---|---|---|
| Test item | 1 | 2 | 3 | 4 |
| (Golf ball) | | | | |
| Deformation amount (mm) | 2.5 | 2.5 | 2.9 | 2.9 |
| Coefficient of restitution | 0.764 | 0.755 | 0.750 | 0.763 |
| Flight performance (W#1; 50 m/sec) | | | | |
| Spin amount (rpm) | 2550 | 2800 | 2850 | 2820 |
| Total (m) | 248 | 244 | 242 | 245 |
| Shot feel | x | ◯ | Δ | x |
| Controllability | ◯ | ◯ | ◯ | ◯ |
| Scuff resistance | ◯ | ◯ | ◯ | ◯ |

As is apparent from the results of Tables 5 and 6, the golf balls of the present invention of Examples 1 to 9, when compared with the golf balls of Comparative Examples 1 to 4, are superior in flight distance, shot feel and controllability.

On the other hand, in the golf ball of Comparative Example 1, since the diameter of the center is small and the thickness of the intermediate layer is large, the shot feel is poor. In the golf ball of Comparative Example 2, since the diameter of the center is small and the thickness of the cover is too large, the coefficient of restitution is small and the spin amount at the time of hitting is large, which reduces the flight distance.

In the golf ball of Comparative Example 3, since the hardness difference ($K_2-K_1$) is smaller than 0, that is, the hardness of the intermediate layer is lower than the surface hardness of the center, the spin amount when hit by a driver is very large and the coefficient of restitution is very small, which reduces the flight distance. In the golf ball of Comparative Example 4, since it is two-piece golf ball having no intermediate layer, the coefficient of restitution is small and the spin amount at the time of hitting is large, which reduces the flight distance. In addition, the shot feel is poor.

What is claimed is:

1. A multi-piece solid golf ball comprising a core consisting of a center and an intermediate layer formed on the center, and a cover covering the core, wherein the center has a diameter of 37 to 41 mm, the intermediate layer has a thickness of 0.5 to 2.0 mm and a hardness in Shore D hardness of 55 to 70, the hardness of the intermediate layer is higher than a surface hardness in Shore D hardness of the center and a hardness in Shore D hardness of the cover, and a specific gravity of the intermediate layer is lower than that of the center by 0.05 to 0.3 and is lower than that of the cover by 0.05 to 0.3, and the cover comprises polyurethane-based thermoplastic elastomer as a main component, and has a thickness of 0.3 to 1.0 mm.

2. The multi-piece solid golf ball according to claim 1, wherein the polyurethane-based thermoplastic elastomer is formed by using cycloaliphatic diisocyanate.

3. The multi-piece solid golf ball according to claim 1, wherein the difference in specific gravity between the intermediate layer and the center is 0.1 to 0.25, and the difference in specific gravity between the intermediate layer and the cover is 0.12 to 0.2.

4. The multi-piece solid golf ball according to claim 1, wherein the center has a diameter of 38 to 40 mm, and has a surface hardness in Shore D hardness of 30 to 65.

5. The multi-piece solid golf ball according to claim 1, wherein the center has a specific gravity of 1.1 to 1.4 and the cover has a specific gravity of 1.00 to 1.30.

6. The multi-piece solid golf ball according to claim 1, wherein the intermediate layer has a hardness in Shore D hardness of 60 to 68, a specific gravity of not more than 1.10 and a thickness of 0.7 to 1.4 mm.

7. The multi-piece solid golf ball according to claim 1, wherein the cover has a thickness of 0.4 to 0.8 mm.

8. The multi-piece solid golf ball according to claim 1, wherein the cover has a hardness which is lower than the hardness of the intermediate layer within the range of 8 to 40 in Shore D hardness, and wherein the center has a hardness lower than the hardness of the intermediate layer in the range of 2 to 20 in Shore D hardness.

9. The multi-piece solid golf ball according to claim 1, wherein the cover comprises polyurethane-based thermoplastic elastomer alone.

10. The multi-piece solid golf ball according to claim 1, wherein the cover comprises polyurethane-based thermoplastic elastomer in combination with at least one member selected from the group consisting of another polyurethane-based thermoplastic elastomer, a polyamide-based thermoplastic elastomer, a polyester thermoplastic elastomer, a polystyrene-based thermoplastic elastomer, a polyolefin-based thermoplastic elastomer, a diene-based block copolymer and an ionomer.

* * * * *